United States Patent
Fujino et al.

(10) Patent No.: US 8,919,204 B2
(45) Date of Patent: Dec. 30, 2014

(54) CONTACT PRESSURE DETECTION APPARATUS AND CONTACT POINT PRESSURE MEASUREMENT APPARATUS

(71) Applicant: Advantest Corporation, Tokyo (JP)

(72) Inventors: Masao Fujino, Miyagi (JP); Toshiaki Hayakawa, Miyagi (JP)

(73) Assignee: Advantest Corporation, Tokyo (JP)

( * ) Notice: Subject to any disclaimer, the term of this patent is extended or adjusted under 35 U.S.C. 154(b) by 72 days.

(21) Appl. No.: 13/717,722

(22) Filed: Dec. 18, 2012

(65) Prior Publication Data

US 2013/0199310 A1 Aug. 8, 2013

(30) Foreign Application Priority Data

Feb. 3, 2012 (JP) ................................. 2012-022165

(51) Int. Cl.
G01L 1/24 (2006.01)

(52) U.S. Cl.
CPC ...................................... G01L 1/241 (2013.01)
USPC .......................................... 73/800; 73/862.01

(58) Field of Classification Search
USPC ................. 73/800, 862.624, 862.01
See application file for complete search history.

(56) References Cited

U.S. PATENT DOCUMENTS

| 4,812,036 | A  | * | 3/1989  | Inoue .............................. 356/32 |
| 7,295,307 | B2 | * | 11/2007 | Naka et al. .................... 356/301 |
| 8,176,790 | B2 | * | 5/2012  | Birch et al. ..................... 73/705 |
| 8,692,990 | B2 | * | 4/2014  | Matousek ...................... 356/301 |

FOREIGN PATENT DOCUMENTS

| JP | H03-277932 A | 12/1991 |
| JP | 2010-127726 A | 6/2010 |
| JP | 2011-64536 A | 3/2011 |
| JP | 2011-158317 A | 8/2011 |

OTHER PUBLICATIONS

Office Action for Japanese Patent Application No. 2012-022165, issued by the Japanese Patent Office on Jan. 7, 2014.

* cited by examiner

*Primary Examiner* — Max Noori

(57) ABSTRACT

To measure contact pressure of each of a plurality of small protrusions arranged at a narrow pitch and contacting a flat surface, provided is a contact pressure detection apparatus comprising a sensor section that is contacted by a target and has pressure applied thereto by the target; a light source section that radiates light with a wavelength causing Raman scattering in the sensor section to which the pressure is applied; and a detecting section that receives light from the sensor section and detects the pressure between the sensor section and the target. Also provided is a contact point pressure measurement apparatus that measures contact pressure of an electrode of a device under test, comprising: a fixing section that has the device under test mounted thereon and fixes the electrode of the device under test in a manner to press against the sensor section; and the contact pressure detection apparatus.

20 Claims, 3 Drawing Sheets

CONTACT PRESSURE DETECTION APPARATUS AND CONTACT POINT PRESSURE MEASUREMENT APPARATUS

BACKGROUND

1. Technical Field

The present invention relates to a contact pressure detection apparatus and a contact point pressure measurement apparatus.

2. Related Art

Conventionally, pressure is measured using a load sensor, a semiconductor warping gauge sensor, a Piezo resistance sensor, an optical fiber sensor, or a plasma resonance sensor, as shown in Patent Document 1, for example.

Patent Document 1: Japanese Patent Application Publication No. 2011-158317

However, when using such measuring devices to measure the contact pressure with which a flat surface contacts each of a plurality of protrusions with diameters of approximately 20 μm arranged at a pitch of approximately 30 μm, for example, it is difficult to measure the contact pressure for each individual protrusion.

SUMMARY

Therefore, it is an object of an aspect of the innovations herein to provide a contact pressure detection apparatus and a contact point pressure measurement apparatus, which are capable of overcoming the above drawbacks accompanying the related art. The above and other objects can be achieved by combinations described in the claims. According to a first aspect of the innovations, provided is a contact pressure detection apparatus comprising a sensor section that is contacted by a target and has pressure applied thereto by the target; a light source section that radiates light with a wavelength causing Raman scattering in the sensor section to which the pressure is applied; and a detecting section that receives light from the sensor section and detects the pressure between the sensor section and the target.

According to a second aspect of the innovations, provided is a contact point pressure measurement apparatus that measures contact pressure of an electrode of a device under test, comprising: a fixing section that has the device under test mounted thereon and fixes the electrode of the device under test in a manner to press against the sensor section; and the contact pressure detection apparatus.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
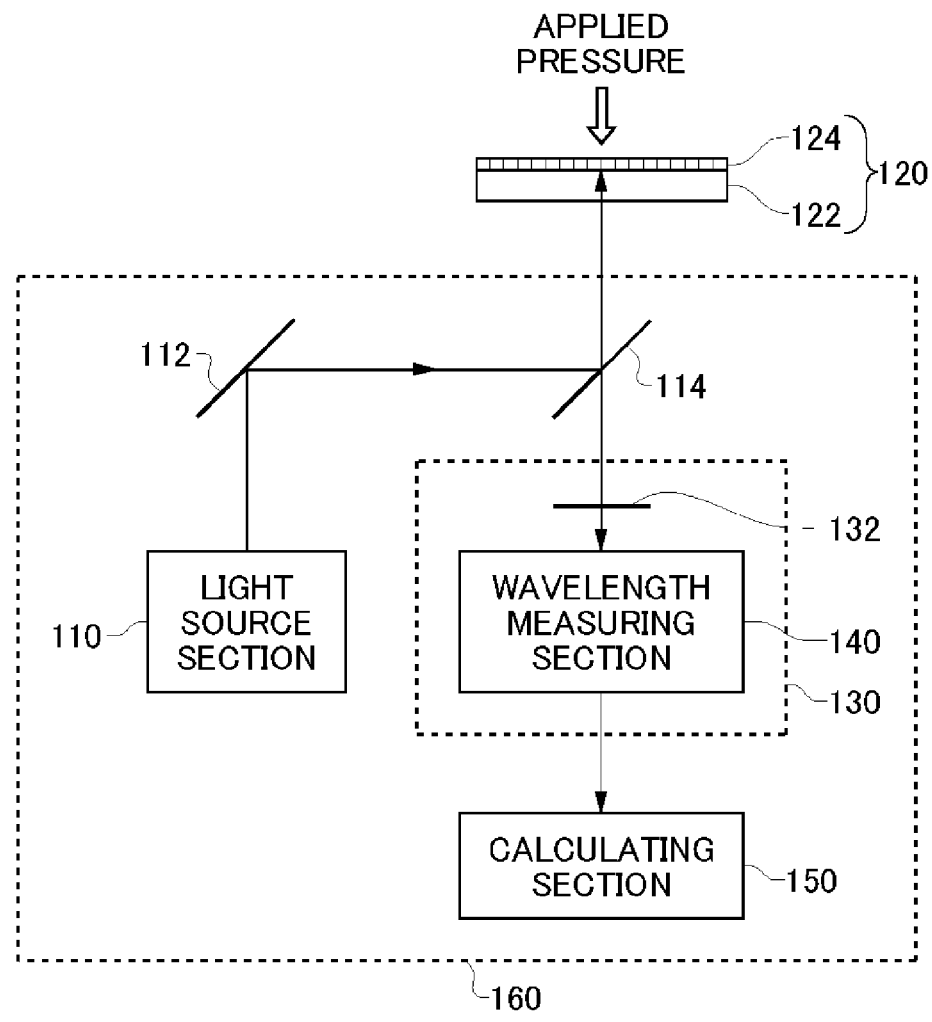
FIG. 1 shows an exemplary configuration of a contact pressure detection apparatus 100 according to an embodiment of the present invention.

FIG. 1 shows an exemplary configuration of a contact pressure detection apparatus 100 according to an embodiment of the present invention. The contact pressure detection apparatus 100 radiates light onto a region that is contacted by a target and has pressure applied to, and detects the contact pressure of the target by detecting Raman scattering of the radiated light. The contact pressure detection apparatus 100 includes a light source section 110, a half mirror 114, a sensor section 120, a detecting section 130, and a calculating section 150.

The light source section 110 irradiates the sensor section 120 with light. The light source section 110 irradiates the sensor section 120 to which pressure is applied with light having a wavelength experiencing Raman scattering. The light source section 110 may include a laser light source and irradiate the sensor section 120 with laser light. The light source section 110 may output visible light. The light source section 110 may include a mirror 112 and/or an optical system such as a lens, and may adjust the focal position and/or the emission direction of the output light. The light source section 110 irradiates the sensor section 120 with light via the half mirror 114.

The half mirror 114 reflects or passes a portion of the light from the light source section 110, and irradiates the sensor section 120 with this light. The half mirror 114 passes or reflects a portion of the light from the sensor section 120. The drawings show an example in which the half mirror 114 reflects a portion of the light from the light source section 110 to irradiate the sensor section 120 with this light, and passes a portion of the light from the sensor section 120.

The sensor section 120 is contacted by the target to have pressure applied thereto. The sensor section 120 causes Raman scattering in the input light and outputs this scattered light in the direction of the incident input light. The sensor section 120 includes a substrate section 122 and a scattering section 124.

The substrate section 122 passes the light radiated by the light source section 110. The substrate section 122 may be formed by a material that does not cause Raman scattering of the light radiated by the light source section 110 even when pressure is applied. Instead, the substrate section 122 may cause Raman scattering that is weaker than the Raman scattering caused by the scattering section 124. In this case, or instead of this, the substrate section 122 may cause Raman scattering with a shift amount that differs from the wavelength shift amount of the Raman scattering caused by the scattering section 124. The substrate section 122 may be formed of glass.

The scattering section 124 is formed on one surface of the substrate section 122, and causes Raman scattering of the wavelength of input light when the target contacts and applied pressure thereto. Raman scattering differs from Rayleigh scattering, in which light having the same wavelength as the radiated light is scattered, and is a phenomenon in which the scattering occurs while changing the wavelength of the radiated light according to oscillation of particles forming a substance, for example. Raman scattering occurs because of the internal state of the substance, and therefore the state of the particles is changed when pressure is applied to the substance, thereby changing the wavelength of the scattered light according to the pressure. In other words, the scattering section 124 outputs light with a wavelength differing from that of the light radiated from the light source section 110, according to the contact pressure from the target.

Here, the light of the light source section 110 is input to the scattering section 124 from the surface thereof on the substrate section 122 side. In other words, the light source section 110 radiates light to the scattering section 124 from the far side of the substrate section 122. In this way, the light source section 110 can radiate light at a region that is contacted by and receives pressure from the scattering section 124. Furthermore, the scattering section 124 outputs a portion of the Raman-scattered light in the direction in which the light of the light source section 110 is input. In other words, the scattering section 124 outputs the Raman-scattered light to a surface that is on the opposite side of the surface to which the pressure of the scattering section 124 is applied.

The scattering section 124 is formed on one surface of the substrate section 122 with a substantially uniform thickness, and the thickness may be less than or equal to the resorption depth for the light emitted by the light source section 110 with respect to the scattering section 124. The intensity of the light irradiating the scattering section 124 attenuates as the light passes through the scattering section 124, and the resorption depth of the scattering section 124 indicates the distance until the input intensity is attenuated to substantially 1/e of its original value. In this way, the scattering section 124 enables the input light to reach the region where the pressure is applied, which is the surface of the scattering section 124 that is opposite the substrate section 122. In other words, the scattering section 124 can efficiently cause Raman scattering by radiating input light at the region in the scattering section 124 that is deformed by the application of pressure to cause Raman scattering.

The scattering section 124 may further include a reflective film that reflects the light radiated by the light source section 110, on the surface of the scattering section 124 opposite the substrate section 122. In this way, the scattering section 124 can efficiently cause Raman scattering by causing the portion of the input light from the light source section 110 that passes through the scattering section 124 to again be in a direction incident to the scattering section 124.

The scattering section 124 may be formed of a material that causes Raman scattering in visible input light. The scattering section 124 may include silicon. For example, the sensor section 120 may include silicon formed as the scattering section 124 on the top surface of the substrate section 122 formed by a glass substrate. Here, the silicon may be monocrystal, polycrystal, or amorphous. Instead, the scattering section 124 may be formed by a material that causes Raman scattering such as a semiconductor material or a polymer material. The scattering section 124 outputs toward the detecting section 130 a portion of the Raman-scattered light.

The detecting section 130 receives the light from the sensor section 120 and detects the pressure between the sensor section 120 and the target. The drawings show an example in which the detecting section 130 receives a portion of the light output from the sensor section 120, specifically the portion that is passed through the half mirror 114. The detecting section 130 includes an optical filter 132 and a wavelength measuring section 140.

Among the light received from the sensor section 120, the optical filter 132 decreases the light whose wavelength is substantially the same as that of the light radiated by the light source section 110. Furthermore, the optical filter 132 has passing characteristics such that the Raman scattering is barely reduced in the light input from the sensor section 120. In other words, the optical filter 132 decreases the noise component in the light input from the sensor section 120.

The wavelength measuring section 140 measures the wavelength of the light passed through the optical filter 132. The wavelength measuring section 140 detects the wavelength shift amount caused in the light radiated by the light source section 110, according to the Raman scattering caused by the scattering section 124. For example, the wavelength measuring section 140 may include a spectrometer that splits the input light and measures the spectrum indicating the optical intensity with respect to the wavelength.

In this way, the wavelength measuring section 140 detects whether Raman scattering has occurred, based on whether light whose wavelength is different from that of the light output by the light source section 110 is detected. Furthermore, the wavelength measuring section 140 detects the magnitude of the contact pressure by detecting the wavelength shift amount between the light whose wavelength differs from that of the light output by the light source section 110 and the wavelength of the light output by the light source section 110.

The calculating section 150 is connected to the detecting section 130 and calculates the contact pressure applied to the sensor section 120 by the target from the detected wavelength shift amount, based on a predetermined correspondence relationship between the applied pressure and the wavelength shift amount. The calculating section 150 may measure the wavelength shift amount and the contact pressure on the sensor section 120 in advance, store the correspondence relationship, and calculate the contact pressure from the wavelength shift amount detected by the detecting section 130.

For example, when radiating light with a wavelength in the visible band, the scattering section 124 formed of silicon outputs Raman-scattered light in which the wavelength is shifted by approximately 1 nm in response to a contact pressure of approximately 100 MPa. The calculating section 150 calculates the contact pressure based on this type of correspondence relationship between the contact pressure and the wavelength shift amount.

As described above, with the contact pressure detection apparatus 100 according to the present embodiment, the pressure applied by the contact with the sensor section 120 can be detected. Furthermore, since the contact pressure detection apparatus 100 detects the contact pressure according to the wavelength shift amount of the light resulting from the Raman scattering of the light radiated from the light source section 110, the contact pressure in a small region can be detected by forming the light radiated by the light source section 110 as a beam and constricting the beam diameter.

Since the contact pressure detection apparatus 100 detects the contact pressure based on the wavelength shift amount of Raman-scattered light, the detection is almost entirely unrelated to the intensity of the Raman-scattered light, and therefore the degree of freedom in the optical system can be increased. Furthermore, since the contact pressure detection apparatus 100 detects the wavelength shift amount of the Raman-scattered light, the light source section 110, the mirror 112, the half mirror 114, the detecting section 130, and the calculating section 150 may be included in a Raman microscope 160. In this case, the contact pressure detection apparatus 100 can detect the contact pressure applied to the sensor section 120 by using the Raman microscope 160 to detect the Raman-scattered light of the sensor section 120.

The contact pressure detection apparatus 100 may detect the contact pressure at a plurality of locations on the sensor section 120. For example, the light source section 110 may scan the light irradiating the sensor section 120 and the detecting section 130 may receive the light from the sensor section 120, detect the contact pressure between the sensor section 120 and the target by associating the light from the light source section 110 with the position of the sensor section 120 being irradiated, and detects the planar distribution of the pressure applied to the sensor section 120 by the target.

Instead, when the optical axis of the light radiated from the light source section 110 to the sensor section 120 is the Z-axis, the contact pressure detection apparatus 100 may fix the sensor section 120 to an XY stage, for example, and cause the sensor section 120 to move in the X and Y directions. In this case, the detecting section 130 can detect the planar distribution of the pressure applied to the sensor section 120 by the target by detecting the contact pressure between the sensor section 120 and the target in association with the position of the light irradiating the sensor section 120 according to the movement of the XY stage.

Figure 2:
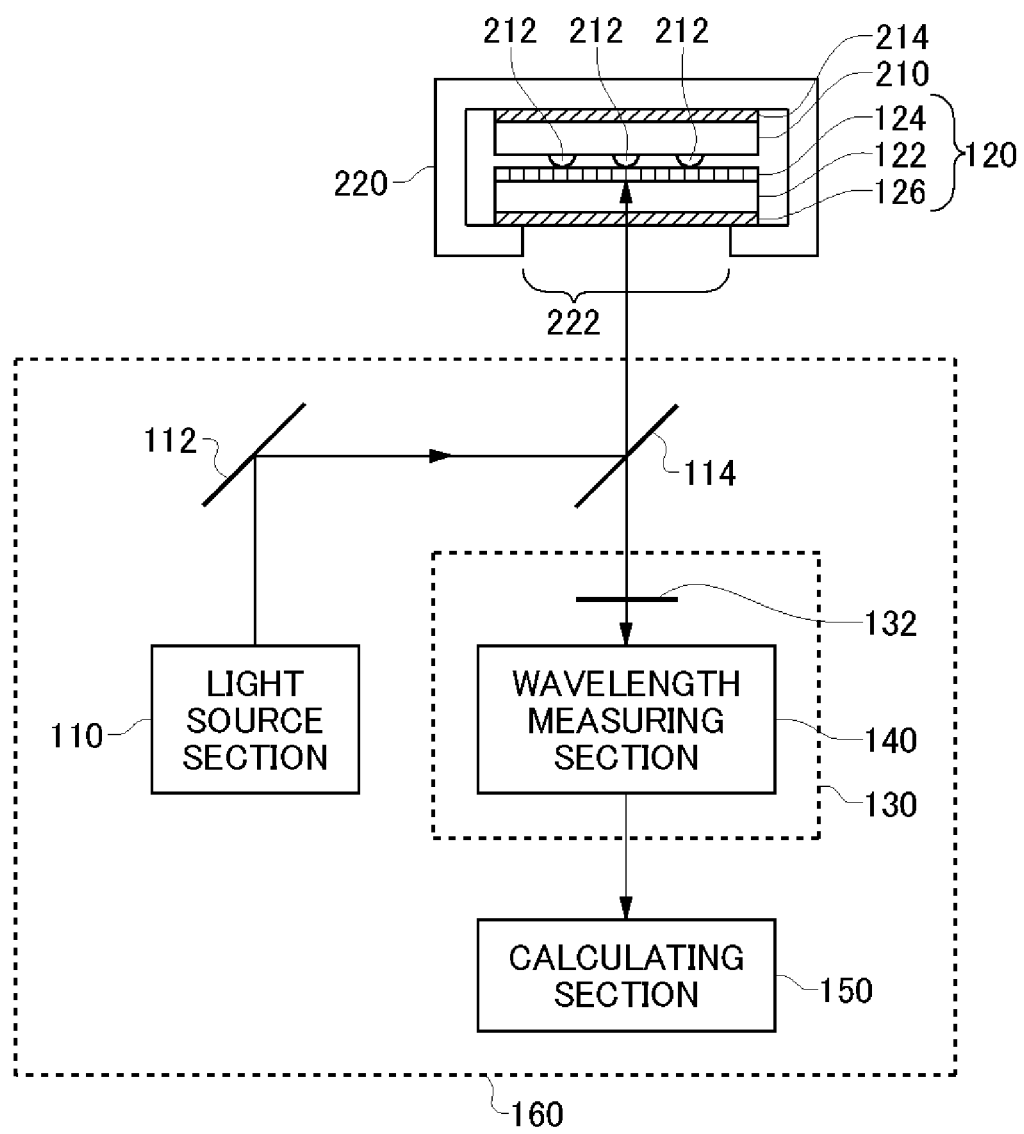
FIG. 2 shows an exemplary configuration of a contact point pressure measurement apparatus 200 according to an embodiment of the present invention, along with a device under test 210.

FIG. 2 shows an exemplary configuration of a contact point pressure measurement apparatus 200 according to an embodiment of the present invention, along with a device under test 210. In the contact point pressure measurement apparatus 200 of the present embodiment, components that are substantially the same as those in the contact pressure detection apparatus 100 of the embodiment shown in FIG. 1 are given the same reference numerals and redundant descriptions are omitted. The contact point pressure measurement apparatus 200 measures the contact pressure of electrodes that form connection points with the device under test 210.

The device under test 210 may be a semiconductor device such as an analog circuit, a digital circuit, a memory, or a system on chip (SOC). The device under test 210 may include electrodes in a ball grid array (BGA) or a land grid array (LGA), for example. Instead, the device under test 210 may include terminals in a small outline j-leaded (SOJ), plastic leaded chip carrier (PLCC), quad flat package (QFP), or small outline package (SOP).

The contact point pressure measurement apparatus 200 measures the contact pressure of the contact point electrodes of the device under test 210. The present embodiment describes an example in which the contact point pressure measurement apparatus 200 measures contact pressure of each of a plurality of BGA electrodes 212 of the device under test 210. The contact point pressure measurement apparatus 200 further includes a fixing section 220.

The device under test 210 is mounted on the fixing section 220, and the electrodes of the device under test 210 are pressed against the sensor section 120 to fix the device under test 210. The fixing section 220 includes an aperture 222 that is provided on the side of the fixing section 220 to which the sensor section 120 is fixed. The light from the light source section 110 passes through the aperture 222 and irradiates the electrodes of the device under test 210. The contact point pressure measurement apparatus 200 can measure the contact pressure of each BGA electrode 212 of the device under test 210 by radiating light onto the regions where the BGA electrodes 212 contact the sensor section 120 and detecting the Raman scattering.

The fixing section 220 may cause the device under test 210 to press against the sensor section 120 with a predetermined pressure. In this way, the contact point pressure measurement apparatus 200 can measure the relationship between the pressure pressing against the device under test 210 and the contact pressure applied to the sensor section 120 by each BGA electrode 212.

Furthermore, the fixing section 220 may include an XY stage or the like that moves in the X or Y direction while keeping the device under test 210 fixed thereto. In addition to this or instead of this, the light source section 110 may scan the light irradiating the sensor section 120. In this way, the contact point pressure measurement apparatus 200 can measure the contact pressure of each BGA electrode 212 of the device under test 210.

The device under test 210 may include a package material 214 on the surface thereof that is opposite the surface on which the BGA electrodes 212 are formed. The sensor section 120 may include a package material 126 on the surface thereof that is opposite the surface contacting the BGA electrodes 212. Here, the package materials 214 and 126 may be formed of the same material as the material used to package the device under test 210. The package materials 214 and 126 may be formed as films.

One package material 214 may house the device under test 210 and the sensor section 120, and the fixing section 220 may fix the packaged device under test 210 and sensor section 120. In this way, the contact point pressure measurement apparatus 200 can measure the contact pressure with the device under test 210 in a packaged state.

Here, by using a light source section 110 that radiates visible laser light, for example, the beam diameter can be set to be approximately 1 μm or less, or the movement precision of the XY stage can be set to be approximately 1 μm or less. In other words, the Raman microscope itself can be set to have a positional resolution of 1 μm or less, and therefore the contact point pressure measurement apparatus 200 can detect the contact pressure in a small area. Accordingly, the contact point pressure measurement apparatus 200 can measure the contact pressure for each protrusion contacting a flat surface when the protrusions have a diameter of approximately 20 μm and are arranged with a pitch of approximately 30 μm.

Figure 3:
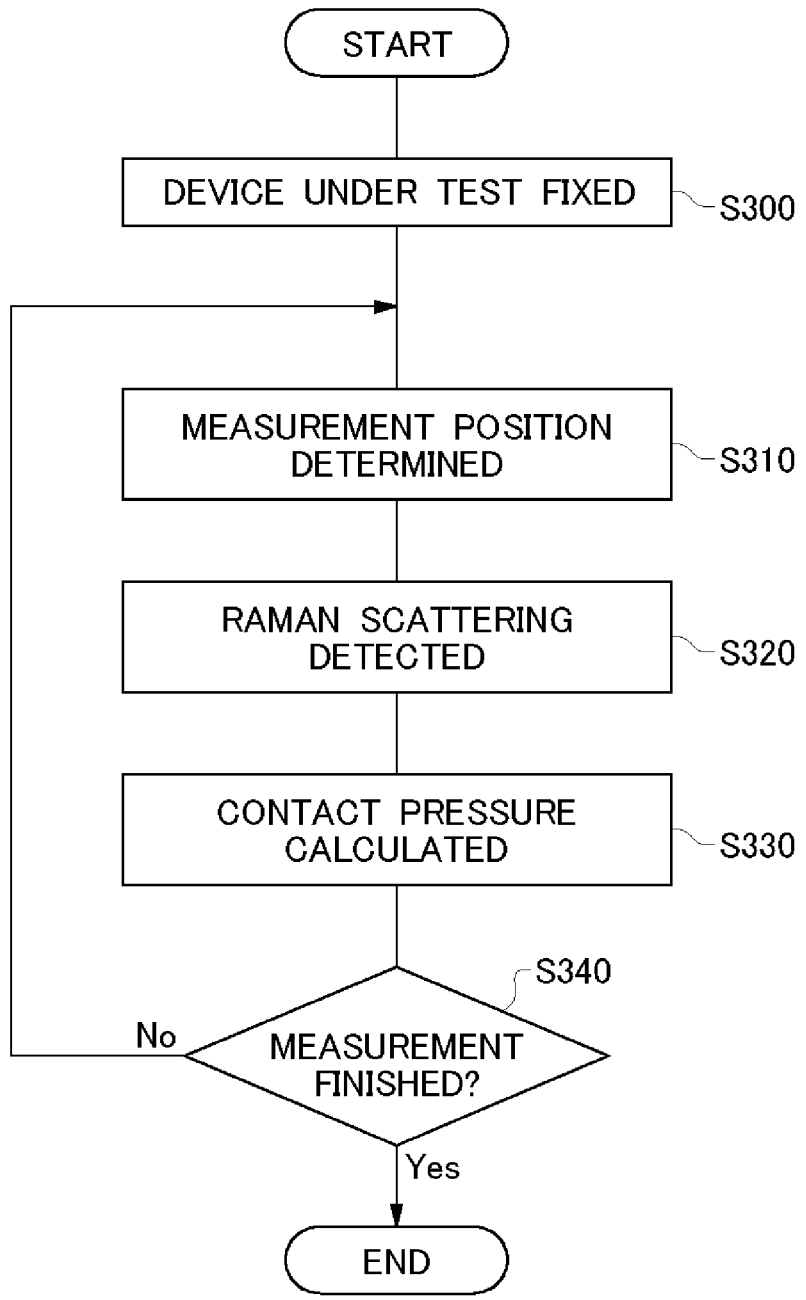
FIG. 3 shows an operational flow of the contact point pressure measurement apparatus 200 according to the present embodiment.

FIG. 3 shows an operational flow of the contact point pressure measurement apparatus 200 according to the present embodiment. The fixing section 220 fixes the device under test 210 (S300). The fixing section 220 fixes the device under test 210 in a state where the device under test 210 is pressing against the sensor section 120.

Next, the contact point pressure measurement apparatus 200 determines the measurement position (S310). Here, the contact point pressure measurement apparatus 200 may cause the fixing section 220 to move in the X or Y directions, or may scan with light from the light source section 110. The contact point pressure measurement apparatus 200 moves the fixing section 220 and/or the position irradiated by the light from the light source section 110 such that the light from the light source section 110 irradiates a position where one of the plurality of BGA electrodes 212 of the device under test 210 contacts the sensor section 120.

Next, the detecting section 130 detects the Raman-scattered light from the sensor section 120 (S320). The calculating section then calculates the contact pressure based on the wavelength shift amount of the detected Raman-scattered light (S330).

The contact point pressure measurement apparatus 200 repeats the processes from step S310, which is the step of determining the measurement position, to step S330, which is the step of calculating the contact pressure, for each measurement location (S340). The contact point pressure measurement apparatus 200 may perform measurement while setting one or more measurement locations for each BGA electrode 212. For example, the contact point pressure measurement apparatus 200 may measure a planar distribution of contact pressure for each BGA electrode 212.

The contact point pressure measurement apparatus 200 may continue the measurements until there are no more locations to be measured. The contact point pressure measurement apparatus 200 may store the target measurement locations in advance. The contact point pressure measurement apparatus 200 can measure the contact pressure for each BGA electrode 212 of the device under test 210 using the process flow described above.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A contact pressure detection apparatus comprising:
   a sensor section that is contacted by a target and has pressure applied thereto by the target;
   a light source section that radiates light with a wavelength causing Raman scattering in the sensor section to which the pressure is applied; and
   a detecting section that receives light from the sensor section and detects the pressure between the sensor section and the target based on the received light.

2. The contact pressure detection apparatus according to claim 1, wherein
   the sensor section includes:
   a substrate section that passes the light radiated by the light source section; and
   a scattering section that is formed on one surface of the substrate section and, when contacted by the target to have pressure applied thereto, causes Raman scattering of input light having the wavelength, and
   the light source section irradiates the scattering section with light from an other surface of the substrate section.

3. The contact pressure detection apparatus according to claim 2, wherein
   the scattering section is formed with a substantially uniform thickness on the one surface of the substrate section, and
   the thickness is less than or equal to resorption depth of the light radiated by the light source section with respect to the scattering section.

4. The contact pressure detection apparatus according to claim 2, wherein
   the substrate section is formed of a material that does not cause Raman scattering of the light radiated by the light source section even when pressure is applied to the material of the substrate.

5. The contact pressure detection apparatus according to claim 2, wherein
   the detecting section includes:
   an optical filter that decreases light whose wavelength is substantially the same as that of the light radiated by the light source section, from among light input from the sensor section; and
   a wavelength measuring section that measures the wavelength of the light passed through the optical filter, and
   the detecting section detects a wavelength shift amount occurring in the light radiated by the light source section, according to the Raman scattering caused by the scattering section.

6. The contact pressure detection apparatus according to claim 5, comprising a calculating section that is connected to the detecting section and calculates contact pressure applied to the sensor section by the target from the detected wavelength shift amount, based on a predetermined correspondence relationship between wavelength shift amount and applied pressure.

7. The contact pressure detection apparatus according to claim 2, wherein
   the scattering section further includes a reflective film that is formed on one surface of the scattering section that is opposite the substrate section and reflects the light radiated by the light source section.

8. The contact pressure detection apparatus according to claim 2, wherein
   the scattering section is formed of a material that causes Raman scattering of visible input light, and
   the light source section irradiates the scattering section with visible light.

9. The contact pressure detection apparatus according to claim 2, wherein
   the scattering section includes silicon.

10. The contact pressure detection apparatus according to claim 2, wherein
    the substrate section is formed of glass.

11. The contact pressure detection apparatus according to claim 1, wherein
    the light source section scans the light irradiating the sensor section,
    the detecting section receives the light from the sensor section and detects the contact pressure between the sensor section and the target in association with a position on the sensor section being irradiated with the light from the light source section, and
    the detecting section detects a planar distribution of the pressure applied to the sensor section by the target.

12. A contact point pressure measurement apparatus that measures contact pressure of an electrode of a device under test, comprising:
    a sensor section that is contacted by the electrode of the device under test and has pressure applied thereto by the electrode of the device under test;
    a light source section that radiates light with a wavelength causing Raman scattering in the sensor section to which the pressure is applied;
    a detecting section that receives light from the sensor section and detects the pressure between the sensor section and the electrode of the device under test based on the received light; and
    a fixing section that has the device under test mounted thereon and fixes the electrode of the device under test in a manner to press against the sensor section.

13. A contact pressure detecting method comprising:
    causing a target to contact and apply pressure to a sensor section;
    radiating light with a wavelength causing Raman scattering in the sensor section to which the pressure is applied; and
    receiving light from the sensor section and detecting the pressure between the sensor section and the target based on the received light.

14. The contact pressure detection apparatus according to claim 1, wherein the sensor section is fixed to a stage that moves in a plane perpendicular to a direction in which the light is radiated, the detecting section receives the light from the sensor section and detects the contact pressure between the sensor section and the target in association with a position on the sensor section being irradiated with the light from the light source section, and the detecting section detects a planar distribution of the pressure applied to the sensor section by the target.

15. The contact point pressure measurement apparatus according to claim 12, wherein the sensor section includes:

a substrate section that passes the light radiated by the light source section; and a scattering section that is formed on one surface of the substrate section and, when contacted by the electrode to have pressure applied thereto, causes Raman scattering of input light having the wavelength, and the light source section irradiates the scattering section with light from an other surface of the substrate section.

16. The contact point pressure measurement apparatus according to claim 15, wherein the scattering section further includes a reflective film that is formed on one surface of the scattering section that is opposite the substrate section and reflects the light radiated by the light source section.

17. The contact pressure detecting method according to claim 13, wherein the sensor section includes:

a substrate section that passes the radiated light; and a scattering section that is formed on one surface of the substrate section and, when contacted by the target to have pressure applied thereto, causes Raman scattering of input light having the wavelength, and said radiating includes irradiating the scattering section with light from an other surface of the substrate section.

18. The contact pressure detecting method according to claim 17, wherein the scattering section further includes a reflective film that is formed on one surface of the scattering section that is opposite the substrate section and reflects the radiated light.

19. The contact pressure detecting method according to claim 13, wherein said radiating includes scanning the light irradiating the sensor section, said detecting includes receiving the light from the sensor section and detecting the contact pressure between the sensor section and the target in association with a position on the sensor section being irradiated with the light, and said detecting includes detecting a planar distribution of the pressure applied to the sensor section by the target.

20. The contact pressure detecting method according to claim 13, wherein the sensor section is fixed to a stage that moves in a plane perpendicular to a direction in which the light is radiated, said detecting includes receiving the light from the sensor section and detecting the contact pressure between the sensor section and the target in association with a position on the sensor section being irradiated with the light, and said detecting includes detecting a planar distribution of the pressure applied to the sensor section by the target.

* * * * *